United States Patent
Mayer-Wegelin et al.

(10) Patent No.: US 7,509,830 B2
(45) Date of Patent: Mar. 31, 2009

(54) METHOD FOR MONITORING A ROTATING RATE SENSOR

(75) Inventors: Raphael Mayer-Wegelin, Bad Homburg (DE); Heinz-Werner Morell, Kaiserslautern (DE); Dietmar Schmid, Villmar (DE)

(73) Assignee: Siemens Aktiengesellschaft, München (DE)

( * ) Notice: Subject to any disclaimer, the term of this patent is extended or adjusted under 35 U.S.C. 154(b) by 420 days.

(21) Appl. No.: 10/562,514

(22) PCT Filed: May 27, 2004

(86) PCT No.: PCT/EP2004/050941

§ 371 (c)(1),
(2), (4) Date: Dec. 28, 2005

(87) PCT Pub. No.: WO2005/001378

PCT Pub. Date: Jan. 6, 2005

(65) Prior Publication Data

US 2006/0272386 A1    Dec. 7, 2006

(30) Foreign Application Priority Data

Jun. 30, 2003   (DE) .............................. 103 29 498

(51) Int. Cl.
*G01P 21/00*   (2006.01)
(52) U.S. Cl. ........................................ 73/1.37; 702/96
(58) Field of Classification Search .................. 73/1.37; 702/96, 116
See application file for complete search history.

(56) References Cited

U.S. PATENT DOCUMENTS

| 5,226,321 A | | 7/1993 | Varnham et al. |
| 5,426,970 A | * | 6/1995 | Florida et al. ................. 73/1.37 |
| 6,029,516 A | * | 2/2000 | Mori et al. ................ 73/1.37 X |
| 6,282,957 B1 | * | 9/2001 | Akimoto et al. ........... 73/1.37 X |
| 6,510,737 B1 | * | 1/2003 | Hobbs ...................... 73/1.37 X |

(Continued)

FOREIGN PATENT DOCUMENTS

| DE | 198 45 185 | 4/2000 |
| EP | 0 307 321 | 3/1989 |
| EP | 0 461 761 | 12/1991 |

*Primary Examiner*—Thomas P Noland
(74) *Attorney, Agent, or Firm*—Cohen Pontani Lieberman & Pavane LLP

(57) ABSTRACT

A method for monitoring a rotation rate sensor comprising a vibration gyroscope that represents a band-pass filter and that is part of at least one control circuit, wherein the control circuit comprises a digital and analog components and excites the vibration gyroscope to vibrate with its natural frequency by supplying it with an excitation signal. An output signal can be gathered from the vibration gyroscope from which the excitation signal and the rotation rate signal can be derived by filtering and amplification. Redundant analog components and at least one analog to digital converter are used to measure analog signals and read characteristic values within the digital components and compare the measured characteristic values with limiting values.

11 Claims, 2 Drawing Sheets

U.S. PATENT DOCUMENTS

| | | |
|---|---|---|
| 6,564,637 B1 | 5/2003 | Schalk et al. |
| 6,883,361 B2 * | 4/2005 | Wyse .......................... 73/1.38 |
| 7,062,403 B2 * | 6/2006 | Betz et al. ................... 702/145 |
| 7,127,932 B2 * | 10/2006 | Morell et al. ................. 73/1.77 |
| 7,134,336 B2 * | 11/2006 | Mase et al. ............... 73/1.37 X |
| 7,188,522 B2 * | 3/2007 | Betz et al. ................ 73/1.37 X |
| 7,228,251 B2 * | 6/2007 | Betz et al. ................... 702/145 |
| 7,263,454 B2 * | 8/2007 | Morell et al. ............... 702/116 |
| 2002/0178813 A1 | 12/2002 | Babala |
| 2007/0194842 A1 * | 8/2007 | Hotelling et al. ........ 702/116 X |

* cited by examiner

METHOD FOR MONITORING A ROTATING RATE SENSOR

CROSS-REFERENCE TO RELATED APPLICATIONS

This is a U.S. national stage of application No. PCT/EP2004/050941, filed on 27 May 2004. Priority is claimed on the following application: Country: Germany, Application No.: 103 29 498.8, Filed: 30 Jun. 2003.

BACKGROUND OF THE INVENTION

The invention relates to a method for monitoring a rotation rate sensor having a vibration gyro, which represents a bandpass filter and is part of at least one control loop which comprises digital and analog components and excites the vibration gyro by supplying an excitation signal at its natural frequency, in which case an output signal can be tapped off from the vibration gyro, from which the excitation signal and a rotation rate signal are derived by filtering and amplification.

By way of example, EP 0 461 761 B1 discloses rotation rate sensors in which a vibration gyro is excited on two radially aligned axes, for which purpose a primary and a secondary control loop are provided, with appropriate transducers on the vibration gyro. When rotation rate sensors such as these are used to stabilize the vehicle movement in vehicles, then dangers can occur as a result of failure or a malfunction. In order to prevent this, functional monitoring must be provided for the rotation rate sensor.

SUMMARY OF THE INVENTION

The method according to the invention allows monitoring such as this in that analog signals are measured and characteristic values within the digital components are read, and are in each case compared with limit values, by means of redundant analog components and at least one analog/digital converter.

The method according to the invention allows largely complete monitoring of the rotation rate sensor during operation, with faults being identified not only in the analog components but also in the digital components. However, this does not preclude measures for further monitoring at given times, for example when the rotation rate sensor is switched on, and in particular when the ignition is switched on or when the motor vehicle is stationary, being carried out in combination with the method according to the invention or within developments of the method according to the invention.

According to an embodiment of the invention, the excitation signal is also modulated with a modulation signal whose frequency produces sidebands which are located within the pass band of the bandpass filter, but are outside the frequency range of the rotation rate signal, in that the amplitude of the modulation signal in the output signal is measured, and in that a fault message is emitted if the amplitude is less than a predetermined threshold value.

This development allows monitoring of the operation of the entire control loop, including the vibration gyro, during operation without influencing the operation of the rotation rate sensor in any way.

The development can be designed in such a way that the output signal is demodulated, after amplification and analog/digital conversion, into an in-phase and a quadrature component, that the in-phase component and the quadrature component are modulated again after filtering and are combined to form the excitation signal, and that the modulation signal is added to the demodulated components.

Measurement signals may be taken from the demodulated components before the addition of the modulation signal, and are demodulated synchronously. In this case, provision is preferably made for the measurement signals to be tapped off before and after filtering of the demodulated output signals.

Since the sidebands which are produced by the modulation, and hence also the modulation signal as well as the measurement signals, have extremely low amplitudes, it is possible to suppress the noise by integrating the synchronously demodulated measurement signals over a predetermined time, and by comparing the value of the integral with the predetermined threshold value. Alternatively, the method can also be carried out in such a way that the synchronously demodulated measurement signals are integrated, and in such a way that the time which the integrated measurement signals take to reach a predetermined threshold value is measured.

With the known vibration gyros, it has been found to be advantageous for the modulation signal to be at a frequency of 200 Hz.

According to another embodiment of the invention, the rotation rate signal is read from the output of the rotation rate sensor, and is compared with a rotation rate signal which is supplied to the output stages. This makes it possible, in particular, to check the output stages to determine whether the rotation rate signal is being passed on correctly.

A check of the rotation rate signal which is passed on to another system can be carried out by a system which is connected to the output sending back the rotation rate signal to its input for checking.

The digital and analog components are continuously checked by checking components, and monitoring components monitor the checking components at least once during one operating cycle.

One advantage of this development is that the continuous monitoring allows fault messages to be produced quickly, indicating the fault to the user and to higher-level systems, and thus the fact that the rotation rate signal may be faulty. This rapid reaction is supplemented by monitoring of the checking components, so that faults are also signaled which admittedly do not directly lead to an incorrect rotation rate signal but can lead to dangers if a second fault occurs. Digital and analog component redundancy is required only to a minor extent for this purpose.

BRIEF DESCRIPTION OF THE DRAWINGS

The invention allows numerous embodiments. One of these will be described in the following text and is illustrated schematically in a number of figures in the drawing, in which.

DETAILED DESCRIPTION OF THE PREFERRED EMBODIMENTS

The exemplary embodiment as well as parts of it are admittedly illustrated in the form of block diagrams. However, this does not mean that the arrangement according to the invention is restricted to an implementation using individual circuits corresponding to the blocks. The arrangement according to the invention can in fact be implemented particularly advantageously using large-scale-integrated circuits. In this case, microprocessors can be used, which carry out the processing steps illustrated in the block diagrams when suitably programmed.

Figure 1:
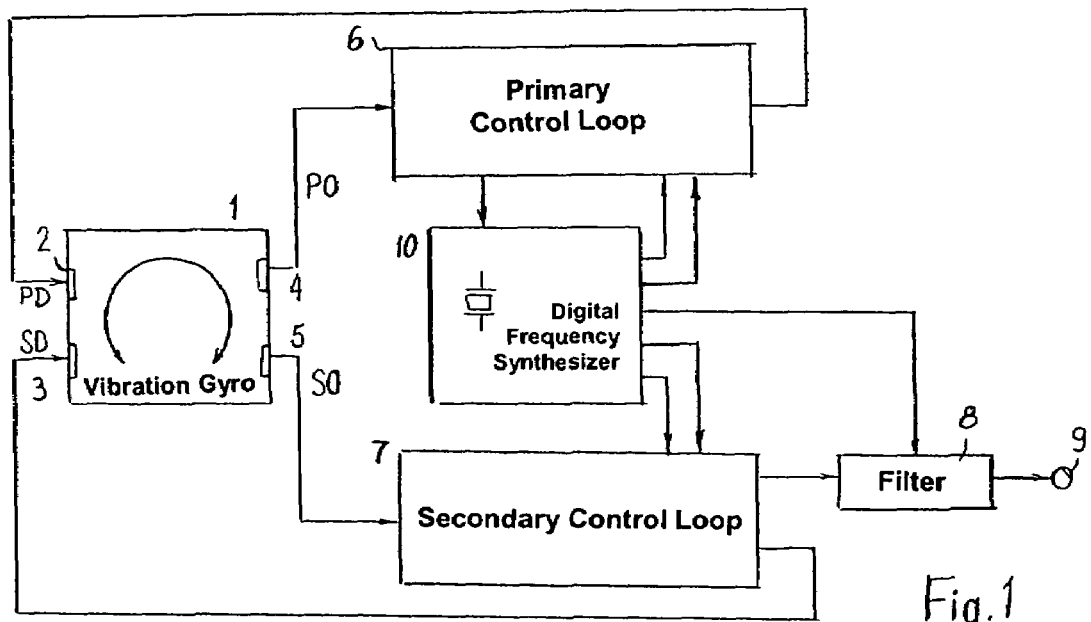
FIG. 1 is a block diagram of a rotation rate sensor.

FIG. 1 shows a block diagram of an arrangement having a vibration gyro 1 with two inputs 2, 3 for a primary excitation signal PD and a secondary excitation signal SD. The excitation is carried out by means of suitable transducers, for example electromagnetic transducers. The vibration gyro also has two outputs 4, 5 for a primary output signal PO and a secondary output signal SO. These signals reproduce the respective vibration at spatially different points of the gyro. Gyros such as these are known, for example, from EP 0 307 321 A1 and are based on the Coriolis force effect.

The vibration gyro 1 represents a high Q-factor filter, with the path between the input 2 and the output 4 being part of a primary control loop 6, and the path between the input 3 and the output 5 being part of a secondary control loop 7. The primary control loop 6 is used to excite oscillations at the resonant frequency of the vibration gyro of, for example, 14 kHz. The excitation in this case is applied to one axis of the vibration gyro, with respect to which the oscillation direction that is used by the secondary control loop is offset through 90°. The signal SO is split in the secondary control loop 7 into an in-phase component and a quadrature component, one of which is passed via a filter 8 to an output 9, from which a signal that is proportional to the rotation rate can be tapped off.

The majority of the signal processing in both control loops 6, 7 is carried out digitally. The clock signals which are required for signal processing are produced in a crystal-controlled digital frequency synthesizer 10, whose clock frequency in the illustrated example is 14.5 MHz.

Figure 2:
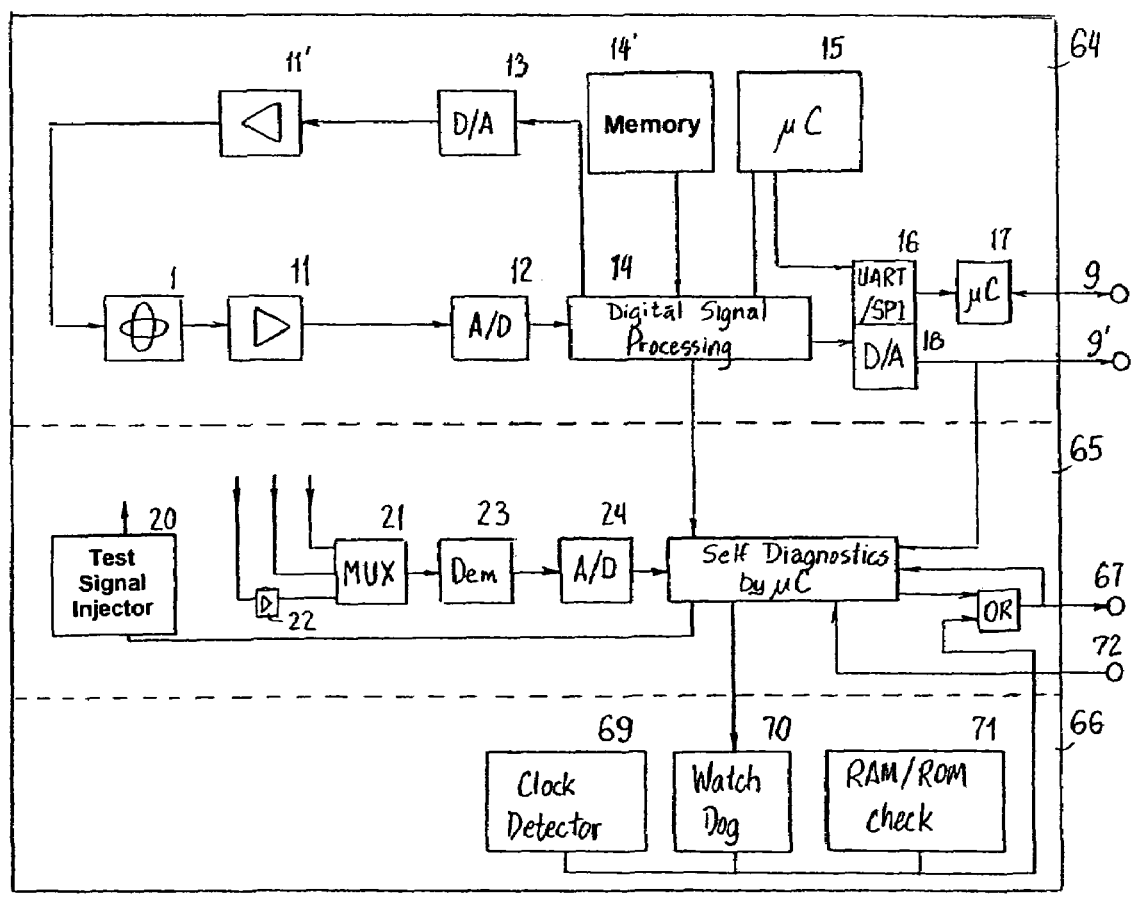
FIG. 2 is a more detailed illustration of the rotation rate sensor shown in FIG. 1.

In the block diagram shown in FIG. 2, components are split into sections 64, 65, 66. In this case, all of those components which are used for the actual operation of the rotation rate sensor are combined in one functional section 64. A checking section 65 contains components for continuous checking of the components in the functional section 64. A monitoring section 66 contains components which monitor the components in the checking section 65 from time to time. Thus, for example, two amplifiers 11, 11', one analog/digital converter 12 and one digital/analog converter 13 are provided for operation of the vibration gyro 1. Further components, for example filters, are not necessary for understanding of the invention, and are therefore not illustrated or explained in any more detail. The signals which are tapped off from the vibration gyro 1, are amplified at 11 and are digitized at 12 are processed digitally at 14, resulting in a drive signal, which is supplied via the digital/analog converter 13 and the amplifier 11' to one input of the vibration gyro.

On switching on, adjustment data is loaded from a nonvolatile memory 14'. Data which includes the rotation rate signal is taken from the digital signal processing 14 via a microcomputer 15, and is passed via a UART/SPI interface 16 to a further microcomputer 17. This passes a digital rotation rate signal to the output 9. In parallel with this, a digital/analog converter 18 is connected to the digital signal processing 14, and an analog rotation rate signal is produced at its output 9'.

The checking section 65 is formed essentially by a self-diagnosis 19 by the microcomputer, with data being available to the digital signal processing 14. In addition, the checking section 65 has a test signal injector 20 (which can be controlled by the self-diagnosis 19 and can supply analog test signals at selectable points to the analog circuits in the functional section 64) in order to check the analog components in the functional section 64. A plurality of points in the analog circuits of the functional section 64 are connected to a multiplexer 21, so that a selectable analog signal can be checked.

An amplifier 22 is provided for the situation where one of these analog signals has a relatively small amplitude. In the exemplary embodiment, the analog signals to be checked are at the carrier frequency. A demodulator 23 is therefore connected to the multiplexer 21. The self-diagnosis 19 can access the analog signals to be checked downstream from the analog/digital conversion 24. The self-diagnosis 19 is provided with the analog output signal from the output 9' and with the alarm signal from the output 67 for further checking. If the self-diagnosis 19 finds a fault, an alarm signal is emitted via the OR circuit 68 and the output 67. In addition, an alarm is signaled via a status bit in the data message of the UART/SPI interface.

The monitoring of the program execution in the microcomputer, of the presence of a clock signal and of the correct operation of the memories is carried out in the monitoring section 66, by means of a clock detector 69, a watchdog 70 and a RAM/ROM check 71. If one of these components finds a fault, an alarm signal is emitted via the OR circuit 68 and the output 67. A self-diagnosis can be started via an input 72, for example during maintenance work or during a pause in operation of the vehicle.

Figure 3:
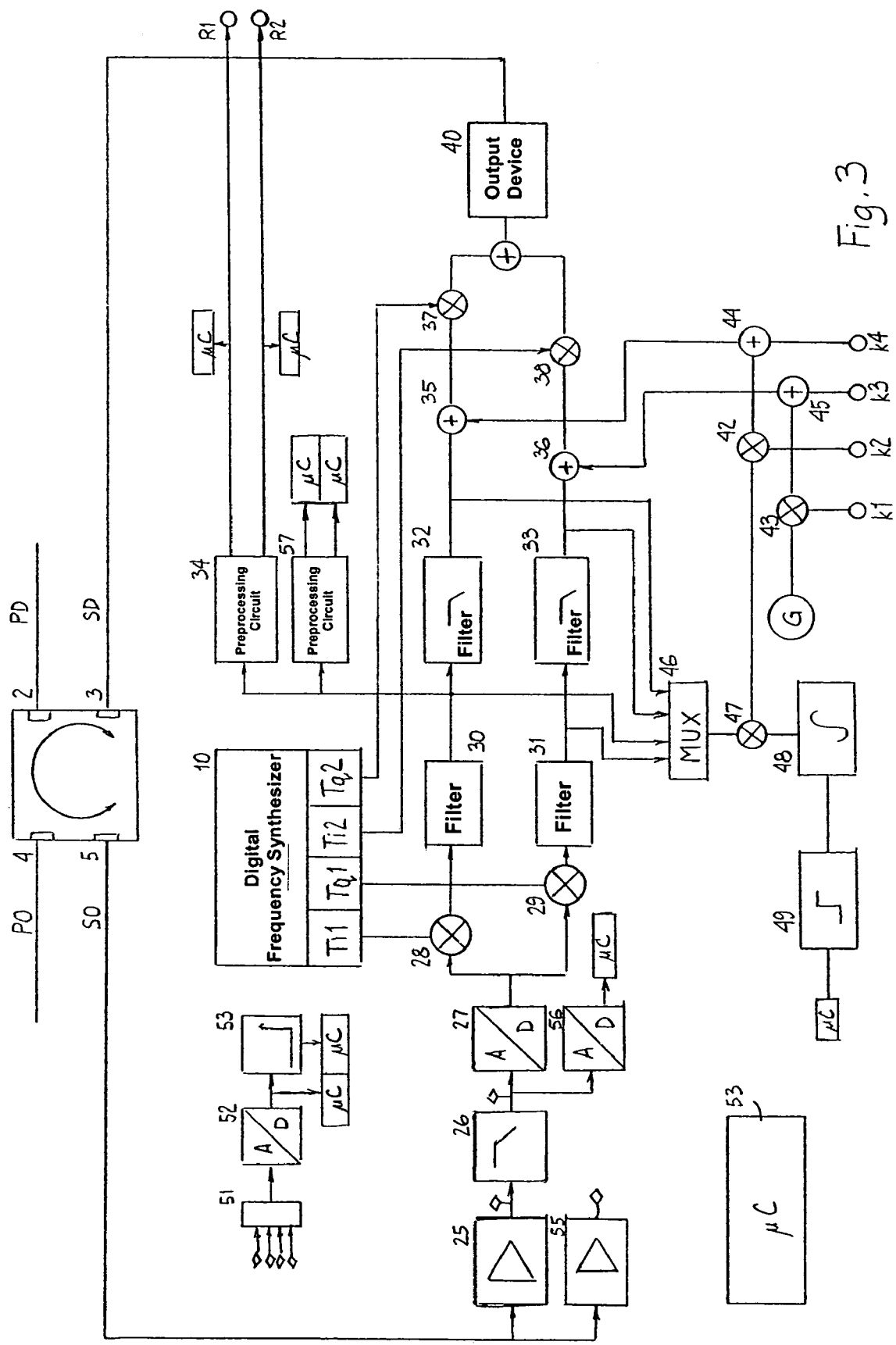
FIG. 3 is a secondary control loop in the rotation rate sensor.

The secondary control loop 7 is illustrated as a block diagram in FIG. 3 and contains an amplifier 25, an anti-aliasing filter 26 and an analog/digital converter 27. Multipliers 28, 29, to which the amplified and digitized signal SO and the carriers Ti1 and Tq1 are supplied, are used for splitting into a real part and an imaginary part.

The two components then respectively pass through a (sinx/x) filter 30, 31 and a low-pass filter 32, 33. Two signals R1 and R2 which represent the rotation rate to be measured by the rotation rate sensor are derived from the filtered real part by means of a preprocessing circuit 34. The signals R1 and R2 differ in that the signal R2 does not occupy the entire amplitude range from, for example, 0 V to +5 V which is possible with the circuit technology being used. In order to output a fault message, the signal R2 is set to zero, thus identifying the connected system as a fault message.

The low-pass filters 32, 33 are followed by a respective adder 35, 36. The two components Si and Sq, respectively, are then remodulated with the carriers Ti2 and Tq2, by means of multipliers 37, 38. An addition process at 39 results once again in a 14 kHz oscillation, which is converted in an output driver 40 to a current which is suitable for excitation of the vibration gyro 1.

In order to check the secondary control loop, a modulation signal at 200 Hz is produced in a generator 41. This signal is multiplied by constants k1 and k2 in two multipliers 42, 43, with these constants k1 and k2 being variable and being loaded from a memory on switching on, so that the amplitudes of the modulation signal for the two components can be varied independently of one another. Variable bias voltages k3 and k4 are added to this in subsequent adders 44, 45. The modulation signal components derived in this way are added in the adders 35 and 36 to the two components of the demodulated output signal. The carrier signal is then modulated with the recombined demodulated output signal, and additionally with the modulation signal, by the subsequent multipliers 37, 38 and the adder 39.

The components which are obtained from the output 5 of the vibration gyro after amplification, anti-aliasing filtering 26, analog/digital conversion and demodulation at 28, 39 are respectively tapped off upstream of the filters 32, 33 and downstream from the filters 32, 33, and are supplied as measurement signals to a multiplexer 46, whose output is connected to a multiplier 47 which is used as a synchronous demodulator. Its output signal is integrated over a greater number of periods at 48, and is passed to a threshold value circuit 49. The presence of the modulation signal is confirmed by the integral exceeding a predetermined threshold value within a predetermined time, causing a microcomputer 53 to produce a fault message.

In addition to this monitoring of the secondary control loop, other checking devices are also included in the exemplary embodiment shown in FIG. 3. For example, measurement points which are connected successively to the input of an analog/digital converter 52 by means of a multiplexer 51 are thus arranged at various points in the rotation rate sensor, and are identified by a rhombus. The value at the output of the analog/digital converter 52 thus in each case represents the magnitude of one of the measured analog signals, and can be monitored directly by a microcomputer 53, or can be passed on via a peak value detector 54 to the microcomputer 53.

The following signals may be quoted as examples of analog signals to be measured and thus to be monitored in this way: the output signal from the amplifier 25, the output signal from the driver circuit 40, the output signal from the anti-aliasing filter 26. Further measurement points may be provided in circuits that are not illustrated, for example voltage supply circuits or at the analog output 9' (FIG. 2).

Owing to the small amplitude and the low signal-to-noise ratio, the output signal SO from the vibration gyro 1 cannot be measured directly, for which reason a redundant amplifier 55 is provided in parallel with the amplifier 25, with its output likewise representing one of the measurement points. If the two output voltages are compared, it is possible to determine whether the output signal SO from the vibration gyro 1 or from one of the amplifiers 25, 55 is faulty.

The analog/digital converter 27 has an associated redundant analog/digital converter 56 whose output can be checked by the microcomputer 53, in the same way as the output of the analog/digital converter 27. A comparison of the output values from the two analog/digital converters likewise makes it possible to draw conclusions relating to defects in the analog/digital converters or in the upstream circuits.

In order to check the rotation rate signal, a redundant preprocessing circuit 57 is located in the arrangement shown in FIG. 2, and its output can likewise be checked by the microcomputer 53. Conclusions relating to the nature of the faults can likewise be drawn by a comparison with the output values from the preprocessing circuit 34, in particular whether one of the preprocessing circuits 34, 57 is operating incorrectly.

What is claimed is:

1. A method of monitoring a rotation rate sensor having a vibration gyro which represents a bandpass filter and is part of at least one control loop having digital and analog components, the vibration gyro being excited by an excitation signal at a natural frequency of the vibration gyro supplied by said at least one control loop, said method comprising the steps of:
   tapping an output signal from the vibration gyro, the excitation signal and a rotation rate signal being derived from the output signal by filtering and amplification;
   measuring analog signals of the analog components;
   reading characteristic values within the digital components; and
   comparing the characteristic values and the analog signals to limit values using redundant analog components and at least one redundant analog/digital converter.

2. The method of claim 1, further comprising the steps of modulating the excitation signal with a modulation signal component whose frequency produces sidebands which are located within a pass band of a bandpass filter and are outside the frequency range of the rotation rate signal; measuring the amplitude of the modulation signal in the output signal; and emitting a fault message if the amplitude of the modulation signal is less than a predetermined threshold value.

3. The method of claim 2, further comprising the steps;
   demodulating the output signal, after amplification and analog/digital conversion, into an in-phase component and a quadrature component;
   modulating the in-phase component and the quadrature component after filtering; combining the modulated in-phase and quadrature components to form the excitation signal; and
   adding a modulation signal component to each of the in-phase component and the quadrature component before said step of modulating.

4. The method of claim 3, further comprising the steps of taking measurement signals from the taking in-phase and quadrature components before the addition of the modulation signal component, and synchronously demodulating the measurement signals.

5. The method of claim 4, wherein said step of taking measurement signals comprises tapping off measurement signals before and after filtering of the in-phase and quadrature components.

6. The method of claim 4, further comprising the step of integrating the synchronously demodulated measurement signals over a predetermined time, and comparing a value of the integral with the predetermined threshold value.

7. The method of claim 4, further comprising the step of integrating the synchronously demodulated measurement signals, and measuring the time which the integrated measurement signals take to reach a predetermined threshold value.

8. The method of claim 2, wherein the modulation signal component has a frequency of about 200 Hz.

9. The method of claim 1, further comprising the steps of generating a first rotation rate signal that is an output of the rotation rate sensor and a second rotation rate signal that is supplied to output stages of the rotation rate sensor, reading the first and second rotation rate signals, and comparing the first and second rate signals for fault determination.

10. The method of claim 1, further comprising the step of sending, by a system which is connected to the output, the rotation rate signal to an input of the system for checking.

11. The method of claim 1, wherein the digital and analog components are continuously checked by checking components, and monitoring components monitor the checking components at least once during one operating cycle.

* * * * *